United States Patent [19]
Karrh et al.

[11] Patent Number: 5,761,261
[45] Date of Patent: Jun. 2, 1998

[54] RUPTURED DISC ACCUMULATOR

[75] Inventors: Charles Jeffrey Karrh, Inglis; Robert Bethel Reynolds, Crystal River; Anthony Petrowsky, Homosassa Springs; Daniel Lyon Jopling, Dunnellon, all of Fla.

[73] Assignee: Florida Power Corporation, St. Petersburg, Fla.

[21] Appl. No.: 854,518

[22] Filed: May 12, 1997

[51] Int. Cl.⁶ ............................................. G21C 9/008
[52] U.S. Cl. ................ 376/283; 376/203; 220/89.2; 137/68.23
[58] Field of Search ........................ 376/203, 204, 376/277, 283, 316, 307; 220/89.2, 203.08; 137/68.23

[56] References Cited

U.S. PATENT DOCUMENTS

| | | | |
|---|---|---|---|
| 3,583,479 | 6/1971 | Taylor | 376/283 |
| 3,698,598 | 10/1972 | Wood et al. | 220/89.2 |
| 4,404,982 | 9/1983 | Ou | 220/89.2 |
| 4,505,289 | 3/1985 | Wilson | 220/89.2 |
| 4,567,016 | 1/1986 | Tong | 376/283 |
| 4,751,938 | 6/1988 | Kerns et al. | 220/89.2 |
| 4,842,004 | 6/1989 | Steinman | 137/68.25 |
| 5,050,630 | 9/1991 | Farwell et al. | 137/68.25 |

*Primary Examiner*—Daniel D. Wasil
*Attorney, Agent, or Firm*—Larson & Larson, P.A.; Herbert W. Watson

[57] ABSTRACT

A nuclear power plant has a cooling system that operates under a variety of temperature and pressure conditions. A storage container is provided to allow expansion of fluid within the cooling system, and access is gained to the interior chamber of the container via a rupture disc. When pressure above a design threshold is exceeded, the rupture disc ruptures allowing fluid to fill the chamber. When desired, a valve may be opened to allow fluid to exit the chamber and travel to a desired location.

9 Claims, 4 Drawing Sheets

5,761,261

1

RUPTURED DISC ACCUMULATOR

BACKGROUND OF THE INVENTION

The present invention relates to a rupture disc and auxiliary fluid storage container for a nuclear power plant cooling system. In the prior art, rupture discs are well known, per se. In this regard, Applicant is aware of the following United States Patents:

U.S. Pat. No. 3,698,598 to Wood et al.
U.S. Pat. No. 4,404,982 to Ou
U.S. Pat. No. 4,505,289 to Wilson
U.S. Pat. No. 4,751,938 to Kerns et al.
U.S. Pat. No. 4,842,004 to Steinman
U.S. Pat. No. 5,050,630 to Farwell et al.

None of these references teaches the concept of incorporating a rupture disc with a fluid storage container for use to allow collection of expansion fluid within a cooling system.

A need has developed for a system to be incorporated into the cooling system of a nuclear power plant to allow for expansions in fluid volume that result from the unusual temperature and pressure fluctuations that may occur during operation of a nuclear power plant. Where system temperature and pressure exceed normal values, it is imperative that cooling water not escape the system. It is with these needs in mind that the present invention was developed.

SUMMARY OF THE INVENTION

The present invention relates to a rupture disc and auxiliary fluid storage container for a nuclear power plant cooling system. The present invention includes the following interrelated objects, aspects and features:

(1) In a first aspect, the present invention is intended to be incorporated into the cooling system for a nuclear power plant when isolation valves are closed. As is known, nuclear power plants utilize heat exchange fluid such as, for example, borated water, both for power generation and for cooling purposes to keep temperatures within safe limits. The present invention contemplates a bypass passageway interconnected into the cooling system and connecting the cooling system to an auxiliary storage container. Reverse flow is allowed and preferred to let the fluid return to the system after cooling.

(2) The auxiliary storage container includes a sealed housing having an internal chamber. The usual temperature of fluid in the cooling system is in the range of 33° to 150° F. During an accident condition, this temperature can rise to as high as 290° F. The gross volume of fluid expansion depends upon the amount of fluid within the closed system, and the size of the chamber is designed to accommodate more than the maximum possible fluid expansion.

(3) The entrance port to the chamber is blocked by a rupture disc that is designed to rupture in response to a differential pressure (the difference between the fluid pressure on one side of the disc and pressure of the atmosphere within the chamber) exceeding a design level. For example, the rupture disc may be designed to rupture when exposed to a differential pressure of 2,500 p.s.i. The entrance to the accumulator chamber downstream of the rupture disc includes a blind bore with a plurality of radial passageways designed to dissipate some of the pressure of the fluid and to prevent damage to the chamber as it is being filled by the fluid.

(4) The container is provided with an exit passageway controlled by a valve so that, when the valve is open, fluid

2 may be drained from the chamber and routed to a desired location. If desired, the exit passageway may be separate from the bypass passageway. Alternatively, the exit passageway may be partially in common with the bypass passageway whereby fluid can be drained from the process line.

Accordingly, it is a first object of the present invention to provide a rupture disc and auxiliary fluid storage container for a nuclear power plant cooling system.

It is a further object of the present invention to provide such a system wherein a rupture disc guards the entrance to a storage container.

It is a still further object of the present invention to provide such a system wherein fluid bypassed into the storage container may be selectively conveyed to a desired location.

These and other objects, aspects and features of the present invention will be better understood from the following detailed description of the preferred embodiment when read in conjunction with the appended drawing figures.

SPECIFIC DESCRIPTION OF THE PREFERRED EMBODIMENT

Figure 1:
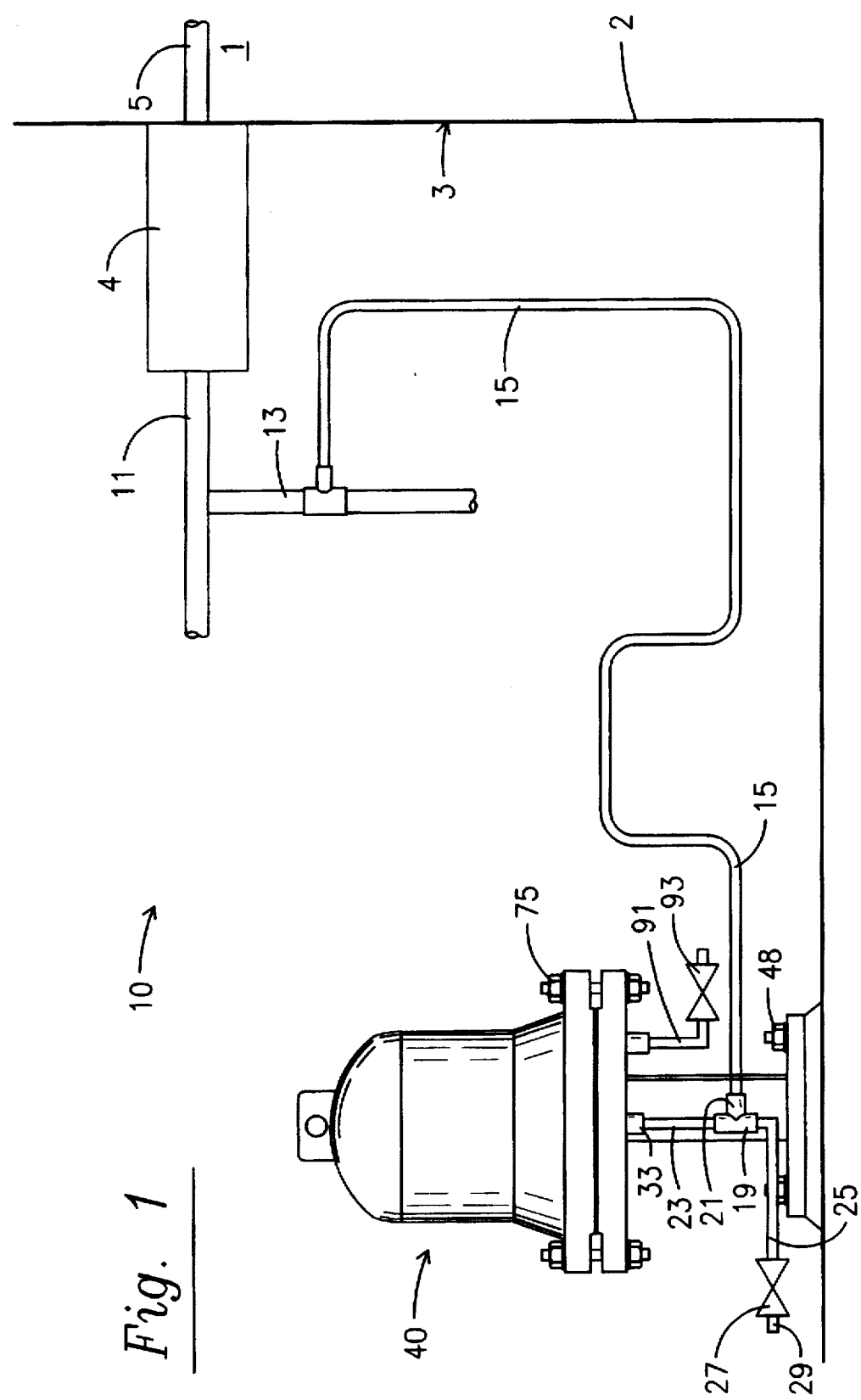
FIG. 1 shows a side view of the present invention.

With reference to FIG. 1, a nuclear power plant system is generally designated by the reference numeral 1 and is seen to include a containment wall 2 having an outer surface 3 to which is mounted a fitting 4 that receives an end of a conduit 5 forming a part of the cooling system of the power plant 1.

With further reference to FIG. 1, the system in accordance with the teachings of the present invention is generally designated by the reference numeral 10 and is seen to include a coupling conduit 11 coupled to the fitting 4 and fluidly connected to the conduit 5. Conduits 5 and 11 can be isolated by valves (not shown). The coupling conduit 11 includes a perpendicular conduit 13 that is connected to a passageway 15 to convey fluid toward the conduit 5. Fluid enters a T-fitting 19 at the single inlet 21 thereof and is conveyed through a conduit 23 as well as through a conduit 25. The conduit 25 is controlled by a valve 27 that may be mechanically controlled in any suitable manner including remotely and that has an outlet 29 that may be used, when the valve 27 is open, to convey liquid to any desired location.

As seen in FIGS. 1–4, the conduit 23 terminates at a coupling 33 attached to the lower wall 43 of a storage container 40 having a housing 41.

The coupling 33 leads to a passageway 45 in the wall 43 that leads to a bore 47 having threaded walls 49 that threadably receive a plug 51 comprising a housing having an internal shoulder 53 on which sits the peripheral edges of a rupture disc 55. The housing of plug 51 has further internally threaded walls 57 that threadably receive an externally threaded plug 59. An annular seal 61 is seated on the peripheral edges of the rupture disc 55 and the plug 59 is threaded into the housing of plug 51 so that the seal 61 bears against the peripheral edges of the rupture disc 55 and sealingly clamps the rupture disc 55 in the position best seen in FIG. 4.

Figure 4:
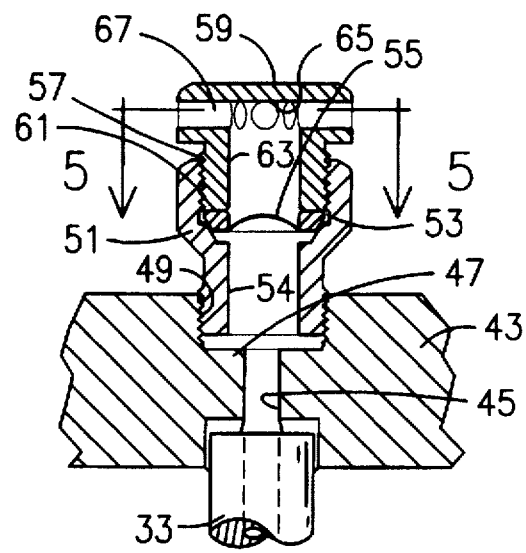
FIG. 4 shows a cross-sectional view along the line 4—4 of FIG. 3.
Figure 5:
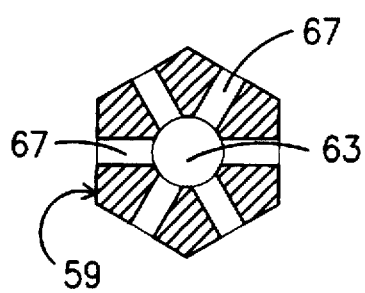
FIG. 5 shows a cross-sectional view along the line 5—5 of FIG. 4.

The plug 59 includes a passageway 63 leading from the rupture disc 55 to a blind end 65 that fluidly connects with a plurality of radially directed ports or openings 67, best seen in FIGS. 4 and 5.

Figure 2:
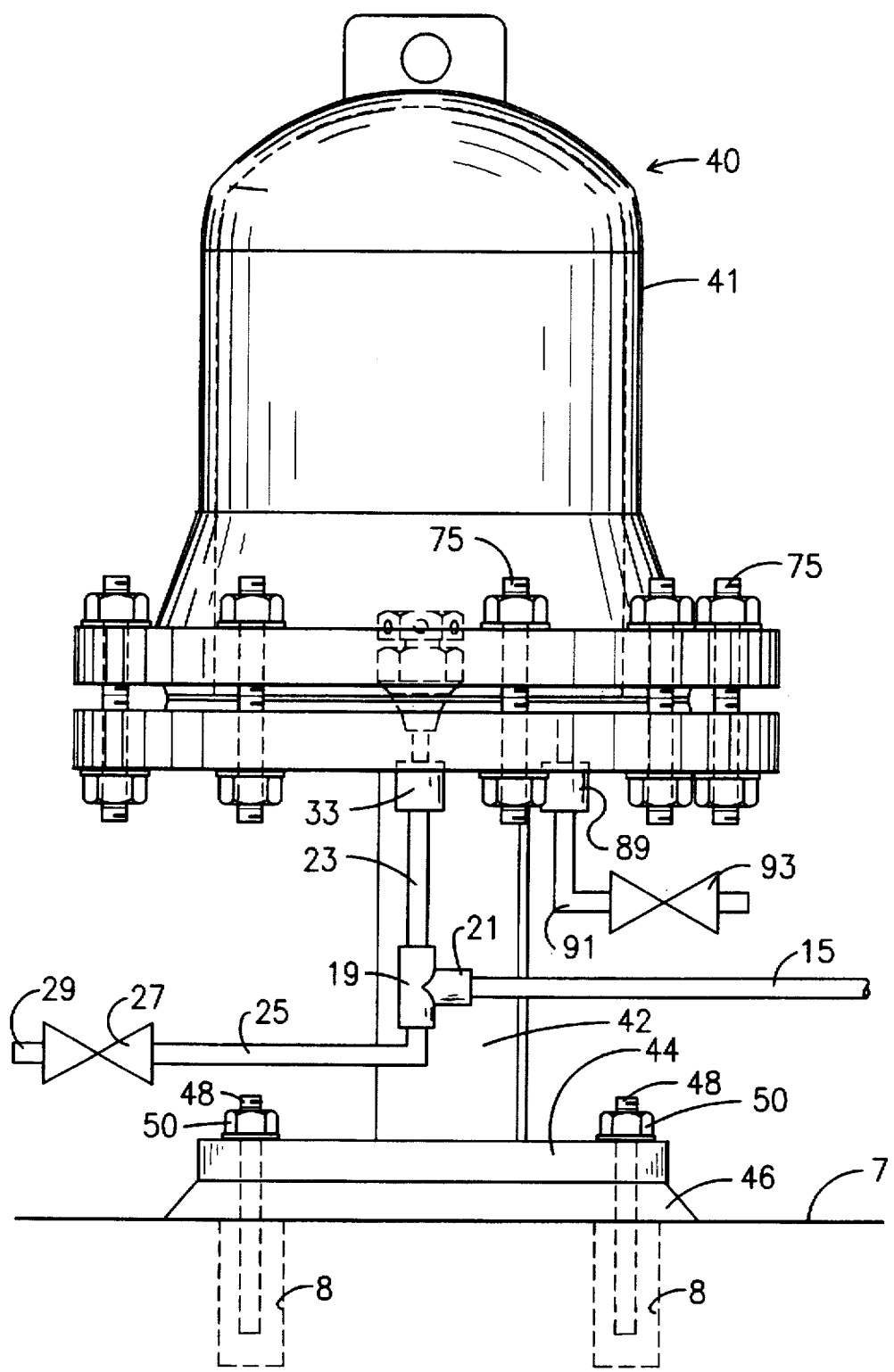
FIG. 2 shows a close-up view of the storage container housing and associated conduits of the present invention.
Figure 3:
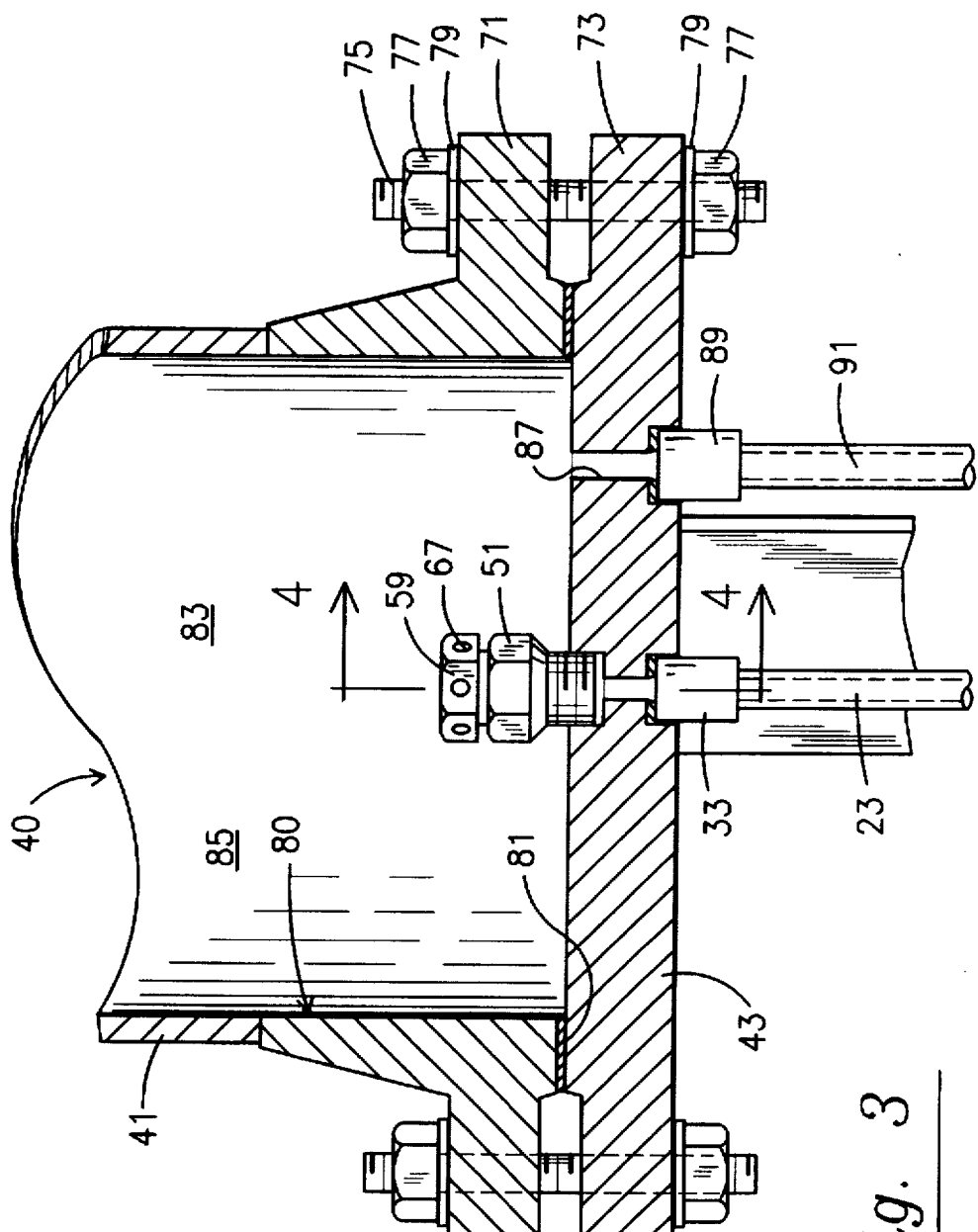
FIG. 3 shows a cross-sectional view through portions of the storage container housing to show detail.

With particular reference to FIGS. 2 and 3, the storage container housing 41 is seen to be clamped to the lower wall 43 by virtue of flanges 71 (on the housing 41) and 73 (on the lower wall 43) and with a plurality of threaded rods 75 extending through aligned openings in the flanges 71 and 73 and clamping the flanges 71, 73 together through the use of nuts 77, and washers 79. The plurality of circumferentially spaced threaded rods 75 is best seen with reference to FIG. 2.

With reference to FIG. 3, a seal 81 is captured between the housing 41 and the lower wall 43 and is clamped through tightening of the nuts 77 to seal the chamber 83 against leakage.

With reference to FIGS. 2 and 3, an additional passageway 87 is formed through the lower wall 43 of the container 40 and leads to a coupling 89 connected to a conduit 91 connected (FIG. 2) with a further valve 93. The valve 93 may be manually or automatically controlled. If the valve 93 is to be automatically controlled, it consists of an over-pressure valve, the outlet of which may be led to a suitable safe location, for example, an additional sealed enclosure.

As best seen with reference to FIG. 2, the container 40 may be suitably secured through the use of a metal plate 42 affixed to a base 44 clamped to the floor 7 by a further plate or a small concrete pad 46, threaded rods 48 suitably sunk into recesses 8 in the floor 7 and threaded nuts 50 threaded over the threaded rods 48 and clamping against the base 44.

With the inventive system having been described in detail, the operation thereof should be self-evident. Fluid within the cooling system of the associated power plant 1 flows through conduit 5, the fitting 4, the coupling 11, the conduit 13 and the passageway 15, and thence to the fitting 19. Fluid flows through the passageway 25 and is stopped by the closed valve 27. Fluid flows through the conduit 23 and is stopped by the rupture disc 55. So long as pressure of fluid within the chamber 54 of the housing of plug 51 below the rupture disc 55 remains below the designed rupture threshold of the disc 55, the inventive system 10 remains in a static condition as described.

Should pressure of fluid within the chamber 54 exceed the threshold designed for the rupture disc 55, the rupture disc 55 will rupture allowing fluid to flow therepast, through the passageway 63 and the radial ports 67 and will begin to fill the chamber 83 within the housing 41 of the container 40. The volume of the chamber 83 is designed to be sufficiently large enough for anticipated expansions of fluid within the cooling system of the associated power plant 1. When the incident that caused rupture of the disc 55 has concluded, the closed valve 27 in the passageway 25 and the valve 93 in the passageway 91 will cause retention of fluid within the chamber 83. As the fluid cools, it can return to the power plant system.

Should it become desirable to empty the power plant fluid, the valve 27 is opened and fluid within the chamber 83 will flow through force of gravity through the ports 67, the passageway 63, the chamber 54, the passageway 45, the coupling 33, the conduit 23, the fitting 19, the conduit 25 and the valve 27 to a desired location.

In the event of an over-pressure situation causing the disc to rupture within the chamber 83, such a situation may be relieved through opening of the valve 93 (FIGS. 1 and 2) and facilitation of fluid flow to a safe storage area such as a sealed tank. The valve 93 may comprise a pressure relief valve.

The integrity of the rupture disc 55 can be checked, with fluid in the power plant system, by opening valve 93. If no fluid exits the valve 93, the integrity of the rupture disc 55 is confirmed.

As such, an invention has been disclosed in terms of a preferred embodiment thereof which fulfills each and every one of the objects of the invention as set forth hereinabove and provides a new and useful rupture disc and auxiliary fluid storage container for a nuclear power plant cooling system of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

We claim:

1. A storage container, for use in a nuclear containment system to receive cooling water under pressure comprising:
   a) a sealed housing defining an internal chamber having a port;
   b) a rupture disc in said port having a face remote from said chamber exposed to fluid pressure in a conduit in fluid communication with a nuclear cooling water source;
   c) the port includes a blind bore leading to a plurality of radially directed openings;
   d) the blind bore and openings formed in a plug received in a rupture disc housing and the plug clamping the rupture disc in the rupture disc housing;
   e) whereby fluid pressure above a design threshold causes rupture of said disc and allows flow of fluid into said chamber.

2. The storage container of claim 1, wherein said design threshold comprises 2,500 p.s.i.

3. The storage container of claim 1, further including a further port connecting said chamber to a pressure relief valve.

4. In a cooling system for a nuclear power plant including at least one flow passage, the improvement comprising storage means for collecting fluid expanded beyond capacity of said cooling system, comprising:
   a) a passageway connected to said flow passage;
   b) a storage container connected to said passageway including a sealed housing defining an internal chamber having a port;
   c) a rupture disc in said port having a face remote from said chamber exposed to fluid pressure; and
   d) the port having a blind bore leading to a plurality of radially directed openings.

5. The storage container system of claim 4, wherein said design threshold comprises 2,500 p.s.i.

6. The storage container system of claim 4, further including a further port connecting said chamber to a pressure relief valve.

7. The storage container system of claim 4, wherein said passageway connects to said port via a T-fitting having an inlet connected to said passageway and a first outlet connected to said port, said T-fitting having a second outlet connected to a further valve.

8. The storage container system of claim 7 wherein said further valve is manually actuable.

9. In a cooling system for a nuclear power plant including at least one flow passage, the improvement comprising storage means for collecting fluid expanded beyond capacity of said cooling system, comprising:

a) a passageway connected to said flow passage leading to a conduit connected by a coupling to a first plug mounted in a lower wall of a containment vessel;

b) the lower wall of the containment vessel sealed to the side walls of the containment vessel to provide an internal chamber for receiving nuclear plant cooling water under pressure;

c) the first plug threadably attached to a second plug, each plug having an inner passageway with the second plug passageway ending in a blind end distal from the first plug;

d) a rupture disc disposed between the first and second plug;

e) a plurality of radially directed openings adjacent the blind end leading to the internal chamber of the containment vessel; and f) means for removing liquid from the containment vessel through the lower wall.

* * * * *